United States Patent
Feehrer et al.

(10) Patent No.: US 10,489,317 B2
(45) Date of Patent: Nov. 26, 2019

(54) AGGREGATION OF INTERRUPTS USING EVENT QUEUES

(71) Applicant: Oracle International Corporation, Redwood Shores, CA (US)

(72) Inventors: John R. Feehrer, Westford, MA (US); Patrick Stabile, Everett, MA (US); Hugh R. Kurth, Bedford, MA (US); David M. Kahn, Makawao, HI (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/960,301

(22) Filed: Apr. 23, 2018

(65) Prior Publication Data

US 2018/0246826 A1 Aug. 30, 2018

Related U.S. Application Data

(63) Continuation of application No. 15/277,146, filed on Sep. 27, 2016, now Pat. No. 9,952,989, which is a continuation of application No. 14/300,388, filed on Jun. 10, 2014, now Pat. No. 9,507,740.

(51) Int. Cl.
*G06F 13/24* (2006.01)
*G06F 13/16* (2006.01)
*G06F 13/40* (2006.01)

(52) U.S. Cl.
CPC ............. *G06F 13/24* (2013.01); *G06F 13/16* (2013.01); *G06F 13/1605* (2013.01); *G06F 13/4068* (2013.01)

(58) Field of Classification Search
CPC ...... G06F 13/24; G06F 13/16; G06F 13/1605; G06F 13/4068
See application file for complete search history.

(56) References Cited

U.S. PATENT DOCUMENTS

| | | |
|---|---|---|
| 6,351,785 B1 | 2/2002 | Chen et al. |
| 6,574,694 B1 | 6/2003 | Chen et al. |
| 8,489,789 B2 | 7/2013 | Serebrin et al. |
| 8,706,941 B2 | 4/2014 | Serebrin et al. |
| 9,507,740 B2 | 11/2016 | Feehrer et al. |
| 9,952,989 B2* | 4/2018 | Feehrer .................. G06F 13/24 |
| 2006/0123160 A1 | 6/2006 | Duckman et al. |
| 2008/0091868 A1 | 4/2008 | Mizrachi et al. |
| 2008/0189720 A1 | 8/2008 | Moertl et al. |
| 2009/0177829 A1 | 7/2009 | Worthington et al. |
| 2009/0327537 A1 | 12/2009 | Bakke et al. |

(Continued)

*Primary Examiner* — Glenn A. Auve
(74) *Attorney, Agent, or Firm* — Meyertons, Hood, Kivlin, Kowert & Goetzel, P.C.

(57) ABSTRACT

Embodiments of input/output hub unit are disclosed for aggregating interrupts received from multiple endpoint devices. The input/output hub may include an interface unit and one or more communication units. Each communication unit may be configured to receive messages from a corresponding endpoint device. The interface unit may be configured to update a first pointer within a first data structure responsive to a request from a given one of the communication units. The interface unit may be further configured to stored data in a second data structure responsive to updating the first pointer, reading a second pointer and the first pointer, and sending an interrupt responsive to a determination that the first and second pointers are equal.

20 Claims, 12 Drawing Sheets

(56) References Cited

U.S. PATENT DOCUMENTS

| | | |
|---|---|---|
| 2010/0077120 A1 | 3/2010 | Wu et al. |
| 2011/0047309 A1 | 2/2011 | Brinkmann et al. |
| 2011/0093637 A1 | 4/2011 | Gupta et al. |
| 2012/0166685 A1 | 6/2012 | Booth et al. |
| 2013/0080673 A1* | 3/2013 | Feehrer .................. G06F 13/24 710/268 |
| 2014/0207980 A1 | 7/2014 | Tsurumi et al. |
| 2015/0006780 A1* | 1/2015 | Shao .................. G06F 13/4022 710/316 |
| 2015/0074322 A1* | 3/2015 | Galles ............... H04L 29/12367 710/313 |

* cited by examiner

AGGREGATION OF INTERRUPTS USING EVENT QUEUES

PRIORITY INFORMATION

The present application is a continuation of U.S. application Ser. No. 15/277,146, filed Sep. 27, 2016 (now U.S. Pat. No. 9,952,989), which is a continuation of U.S. application Ser. No. 14/300,388, filed Jun. 10, 2014 (now U.S. Pat. No. 9,507,740); the disclosures of each of the above-referenced applications are incorporated by reference herein in their entireties.

BACKGROUND

Technical Field

This invention relates to computing systems, and more particularly, to techniques for handling hardware and software interrupts in the system.

Description of the Related Art

Computer systems may include multiple processors or nodes, each of which may include multiple processing cores. Such systems may also include various Input/Output (I/O) devices, which each processor may send data to or receive data from. For example, I/O devices may include ethernet network interface cards (NICs) that allow the processors to communicate with other computer systems, and external peripherals such as printers, for example. Various forms of storage devices, such as, e.g., mechanical and solid-state disk drives, and the like, may also be included with a computing system.

I/O devices, such as those described above, may send interrupts to signal various events. For example, an I/O device may send an interrupt to signal the completion of a direct memory access (DMA) operation. An I/O device may also be sent to inform software of an internally detected error, or of an error on an I/O link coupled to the I/O device.

Each processor may have multiple threads of execution. When an interrupt is received, a designated processing thread may execute specialized program instructions. Such program instructions may include instructions to query and/or clear error status or log registers. Dependent upon the severity of the error that initiated the interrupt, portions of the computer system may be reset, or hardware may be reconfigured.

SUMMARY

Various embodiments of an apparatus and method for handling interrupts in a computing system are disclosed. Broadly speaking, a method and apparatus are contemplated in which an input/output unit includes a one or more communication units and an interface unit. Each one of the communication units may be configured to receive a message from a corresponding endpoint device. The interface unit may be configured to update a first pointer included within a first data structure located in a memory responsive to a request from a given one of the one or more communication units. Responsive to updating the first pointer, the interface unit may be further configured to store data in a second data structure located in the memory, read the first and a second pointer from the first data structure, and send an interrupt responsive to a determination that the read first pointer and the read second pointer are equal.

In a non-limiting embodiment, to update the first pointer, the interface unit may be further configured to increment the first pointer. In another non-limiting embodiment, the interface unit may be further configured to send the updated first pointer to the given one of the communication units.

In one implementation, the interface unit may be further configured to store data in the second data structure responsive to a request from the given one of the communication units.

In another non-limiting embodiment, the interface unit may be further configured to update the second pointer. The updated pointer may then be stored by the interface unit in the first data structure.

Figure 1:
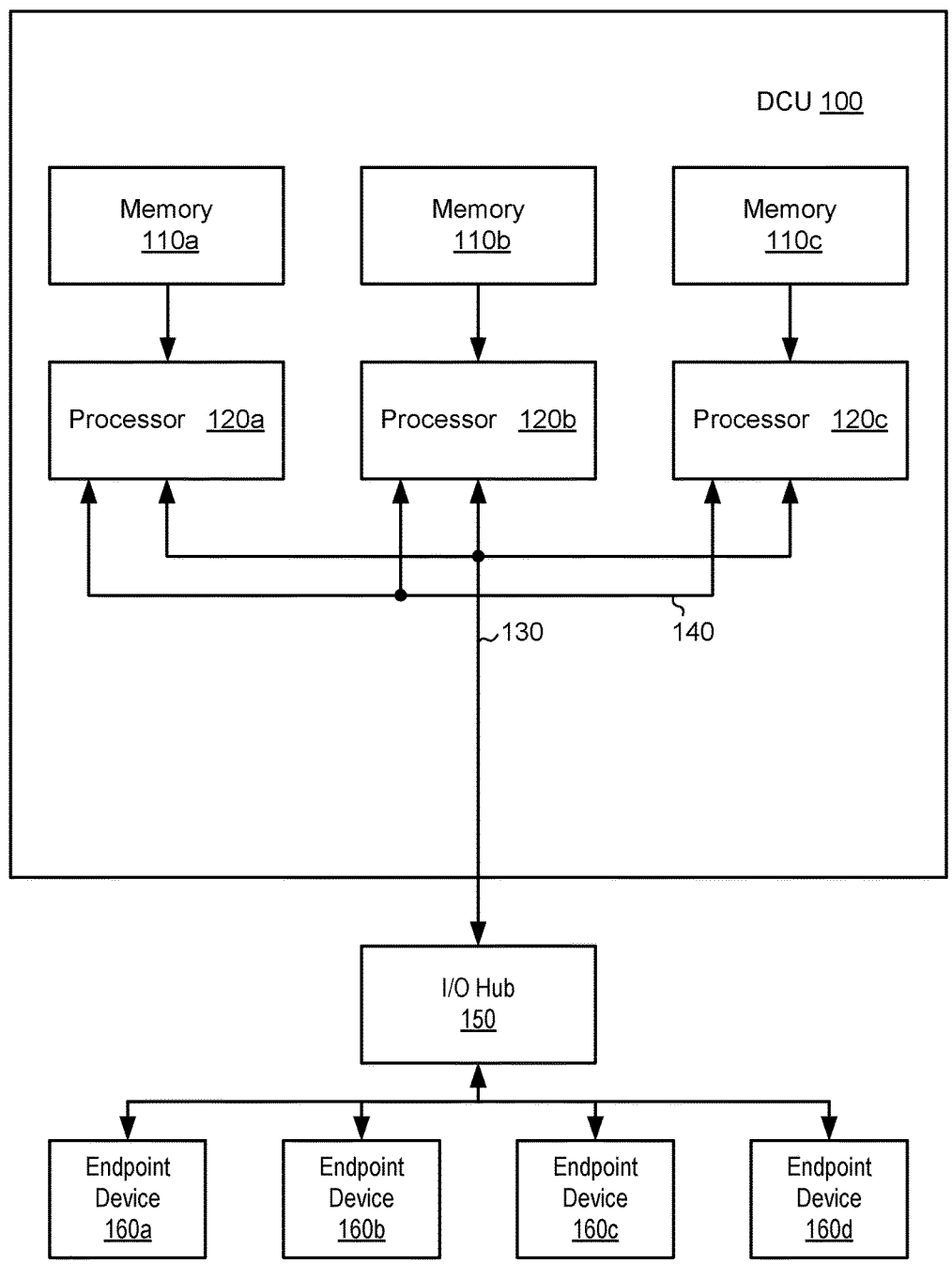
FIG. 1 is a block diagram of an embodiment of a computing system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION OF EMBODIMENTS

In multi-processor computing systems, there may be may execution threads available to service Input/Output (I/O) interrupts. If interrupts are frequent, or the interrupts target a specific execution thread, a reduction in processing of a application software may result. In some cases, an interrupt mask may be employed to inhibit the sending of additional interrupts while a previously received interrupt is still being handled by software.

Another approach may be to employ a round robin scheduling algorithm to distribute the interrupts amongst a fixed pool of execution threads. Such approaches may result in important events to be dropped or lost, and may not be flexible enough to adapt to changes in workload or the power gating of processor cores to save power. The embodiments illustrated in the drawings and described below may provide techniques for handling interrupts that take advantage of available processing threads to minimize the impact on processing performance.

Computing System Overview

A block diagram illustrating one embodiment of a distributed computing unit (DCU) 100 is shown in FIG. 1. In the illustrated embodiment, DCU 100 includes a plurality of processors 120a-c. Processors 120a-c are in turn coupled to memory units 130a-c, respectively, as well as peripheral storage device 140. Processors 120b is further coupled to Input/Output (I/O) hub 150 which is, in turn, coupled to endpoint devices 160a-d. In various embodiments, DCU 100 may be configured as a rack-mountable server system, a standalone system, or in any suitable form factor. In some embodiments, DCU 100 may be configured as a client system rather than a server system.

Memory units 130a-c may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one memory is shown unit in shown coupled to a respective processor, in various embodiments, any suitable number of memory units may be employed by a given processor.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through bus 140 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

I/O hub 150 may be configured to communication with each of endpoint devices 160a-d, relaying requests from the processors to the endpoint devices and returning responses via bus 130. Bus 130 may employ one of various communication protocols, such as, e.g., peripheral component interface express (PCIe), or any other suitable communication protocol. As described below in more detail, I/O hub 150 may include multiple Root Complexes and an I/O link interface unit, and may be configured to send read-modify-write commands to data structures in memories 130a-c that may be used for managing interrupt handling. Although a single I/O hub is depicted in FIG. 1, in other embodiments, multiple I/O hubs may be employed, each of which coupled to additional endpoint devices.

Endpoint devices 160a-d may, in some embodiments, include magnetic, optical, or solid-state storage media such as hard drives, optical disks, non-volatile random-access memory devices, etc. In other embodiments, endpoint devices 160a-d may include more complex storage devices such as disk arrays or storage area networks (SANs), which may be coupled to I/O hub 150 via a standard Small Computer System Interface (SCSI), a Fibre Channel interface, a Firewire® (IEEE 1394) interface, PCIe, or another suitable interface. Additionally, it is contemplated that in other embodiments, any other suitable endpoint devices may be coupled to I/O hub 150, such as multi-media devices, graphics/display devices, standard input/output devices, etc.

The embodiment of the distributed computing system illustrated in FIG. 1 is one of several examples. In other embodiments, different numbers and configurations of components are possible and contemplated.

Processor Overview

Figure 2:
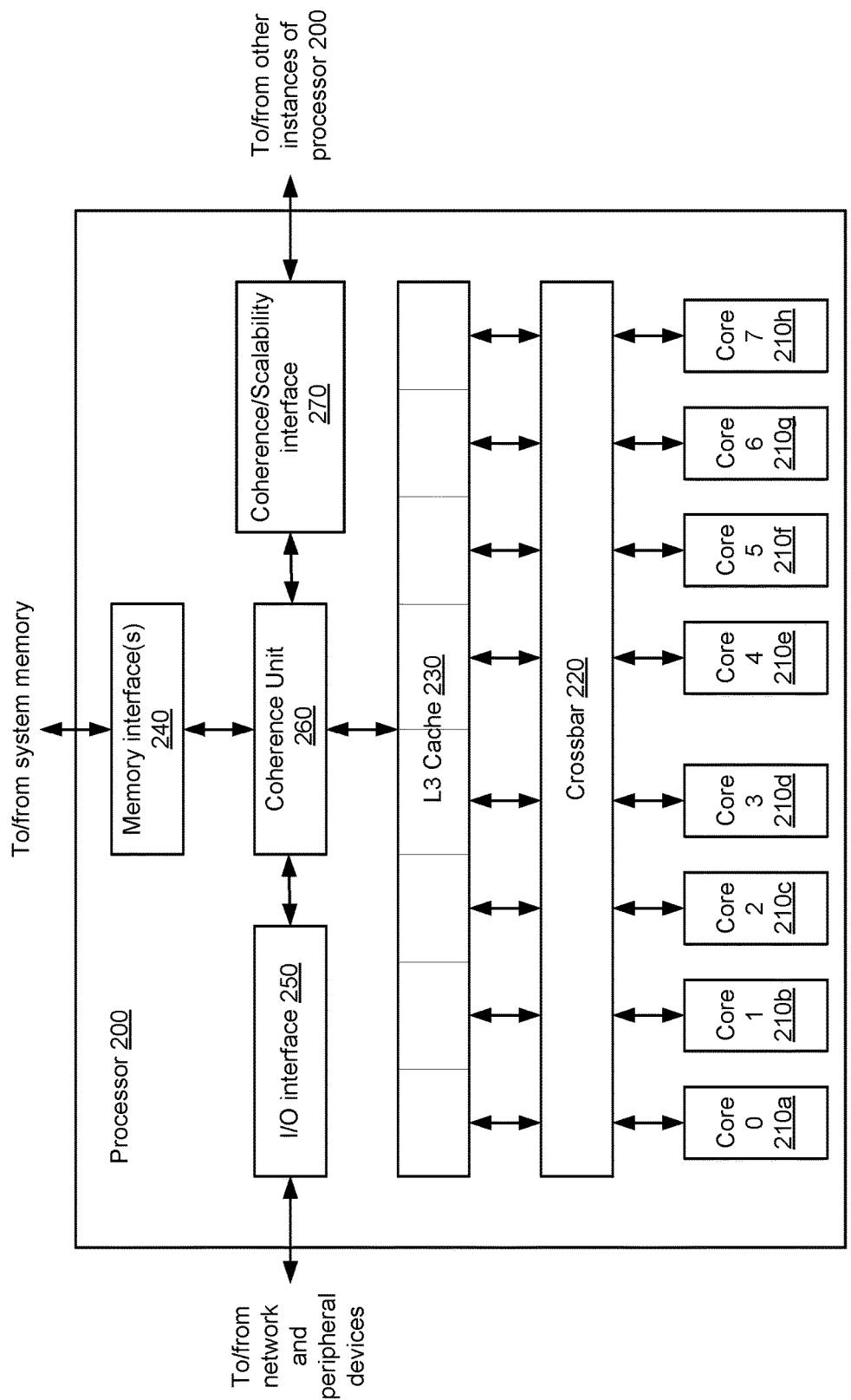
FIG. 2 is a block diagram of an embodiment of a processor.

A block diagram illustrating one embodiment of a multithreaded processor 200 is shown in FIG. 2. In some embodiments, processor 200 may correspond to processors 120a-c of DCU 100 in FIG. 1. In the illustrated embodiment, processor 200 includes a plurality of processor cores 210a-h, which are also designated "core 0" though "core 7." It is noted that although 8 cores are shown, in various embodiments, any suitable number of processor cores may be employed. Each of cores 210 is coupled to an L3 cache 230 via a crossbar 220. L3 cache 230 is coupled to coherence unit 260 which is in turn coupled to input/output (I/O) interface 250, coherence/scalability interface 270. Additionally, coherence unit 260 is coupled to one or more memory interface(s) 240, which are coupled in turn to one or more banks of system memory (not shown). As described in greater detail below, I/O interface 250 may couple processor 200 to peripheral devices, and a network. Coherence/scalability interface 270 may couple processor 200, to other instances of processor 200, to construct a cache-coherent shared multi-processor system interconnect. In some embodiments, the elements included in processor 200 may be fabricated as part of a single integrated circuit (IC), for example on a single semiconductor die.

Cores 210 may be configured to execute instructions and to process data according to a particular instruction set architecture (ISA). In one embodiment, cores 210 may be configured to implement the SPARC® V9 ISA, although in other embodiments it is contemplated that any desired ISA may be employed, such as x86, PowerPC® or MIPS®, for example. In the illustrated embodiment, each of cores 210 may be configured to operate independently of the others, such that all cores 210 may execute in parallel. Additionally, in some embodiments each of cores 210 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 210 may also be referred to as a multithreaded (MT) core. In one embodiment, each of cores 210 may be configured to concurrently execute instructions from eight threads, for a total of 64 threads concurrently executing across processor 200. However, in other embodiments it is contemplated that other numbers of cores 210 may be provided, and that cores 210 may concurrently process different numbers of threads.

Crossbar 220 may be configured to manage data flow between cores 210 and the shared L3 cache 230. In one embodiment, crossbar 220 may include logic (such as multiplexers or a switch fabric, for example) that allows any core 210 to access any bank of L3 cache 230, and that conversely allows data to be returned from any L3 bank to any core 210. Crossbar 220 may be configured to concurrently process data requests from cores 210 to L3 cache 230 as well as data responses from L3 cache 230 to cores 210. In some embodiments, crossbar 220 may include logic to queue data requests and/or responses, such that requests and responses may not block other activity while waiting for service. Additionally, in one embodiment crossbar 220 may be configured to arbitrate conflicts that may occur when multiple cores 210 attempt to access a single bank of L3 cache 230.

L3 cache 230 may be configured to cache instructions and data for use by cores 210. In the illustrated embodiment, L3 cache 230 may be organized into eight separately addressable banks that may each be independently accessed, such that in the absence of conflicts, each bank may concurrently return data to a respective core 210. In some embodiments, each individual bank may be implemented using set-associative or direct-mapped techniques. For example, in one embodiment, L3 cache 230 may be a 48 megabyte (MB) cache, where each bank is 12-way set associative with a 64-byte line size, although other cache sizes and geometries are possible and contemplated. L3 cache 230 may be implemented in some embodiments as a writeback cache in which written (dirty) data may not be written to system memory until a corresponding cache line is evicted.

In some embodiments, L3 cache 230 may be configured to operate in a diagnostic mode that allows direct access to the cache memory. For example, in such a mode, L3 cache 230 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L3 cache 230 that may be used by, for example, service processor 110 to store data into L3 cache 230. Alternatively, crossbar 220 may be configured to allow direct access to L3 cache 230 by processor cores 210 or through network interface 270 or I/O interface 250.

L3 cache 230 may be further configured to implement a built-in self-test (BIST). An address generator, a test pattern generator, and a BIST controller may be included in L3 cache 230. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L3 cache 230 are capable of storing both a logical 0 and logical 1. In the case where the BIST determines that not all data storage cells within L3 cache 230 are functional, a flag or other signal may be sent to service processor 110 or one or more of processor cores 210 indicating that L3 cache 230 is faulty.

In some embodiments, L3 cache 230 may implement queues for requests arriving from and results to be sent to crossbar 220. Additionally, in some embodiments L3 cache 230 may implement a fill buffer configured to store fill data arriving from memory interface 240, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 230 may variously be implemented as single-ported or multiported (i.e., capable of processing multiple concurrent read and/or write accesses). In either case, L3 cache 230 may implement arbitration logic to prioritize cache access among various cache read and write requestors.

Memory interface 240 may be configured to manage the transfer of data between L3 cache 230 and system memory, for example in response to L3 fill requests and data evictions. In some embodiments, multiple instances of memory interface 240 may be implemented, with each instance configured to control a respective bank of system memory. Memory interface 240 may be configured to interface to any suitable type of system memory, such as described above in reference to FIG. 1 In some embodiments, memory interface 240 may be configured to support interfacing to multiple different types of system memory.

In the illustrated embodiment, processor 200 may also be configured to receive data from sources other than system memory. I/O interface 250 may be configured to provide a central interface for such sources to exchange data with cores 210 and/or L3 cache 230 via coherence unit 260. In some embodiments, I/O interface 250 may be configured to coordinate Direct Memory Access (DMA) transfers of data between external peripherals and system memory via coherence unit 260 and memory interface 240. In addition to coordinating access between crossbar 220 and other interface logic, in one embodiment I/O interface 250 may be configured to couple processor 200 to external boot and/or service devices. For example, initialization and startup of processor 200 may be controlled by an external device (such as, e.g., a FPGA) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

I/O interface 250 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics sub systems), multimedia devices (e.g., audio processing subsystems), or any other suitable type of peripheral device. In one embodiment, I/O interface 250 may implement one or more instances of an interface such as Peripheral Component Interface Express (PCI Express™), although it is contemplated that any suitable interface standard or combination of standards may be employed. For example, in some embodiments I/O interface 250 may be configured to implement a version of Universal Serial Bus (USB) protocol or IEEE 1394 (Firewire®) protocol in addition to or instead of PCI Express™. I/O interface 250 may also be configured to coordinate data transfer between processor 200 and one or more devices (e.g., other computer systems) coupled to processor 200 via a network. In one embodiment, I/O interface 250 may be configured to perform the data processing in order to implement an Ethernet (IEEE 802.3) networking standard such as Gigabit Ethernet or 10-Gigabit Ethernet, for example, although it is contemplated that any suitable networking standard may be implemented. In some embodiments, I/O interface 250 may be configured to implement multiple discrete network interface ports.

Core Overview

Figure 3:
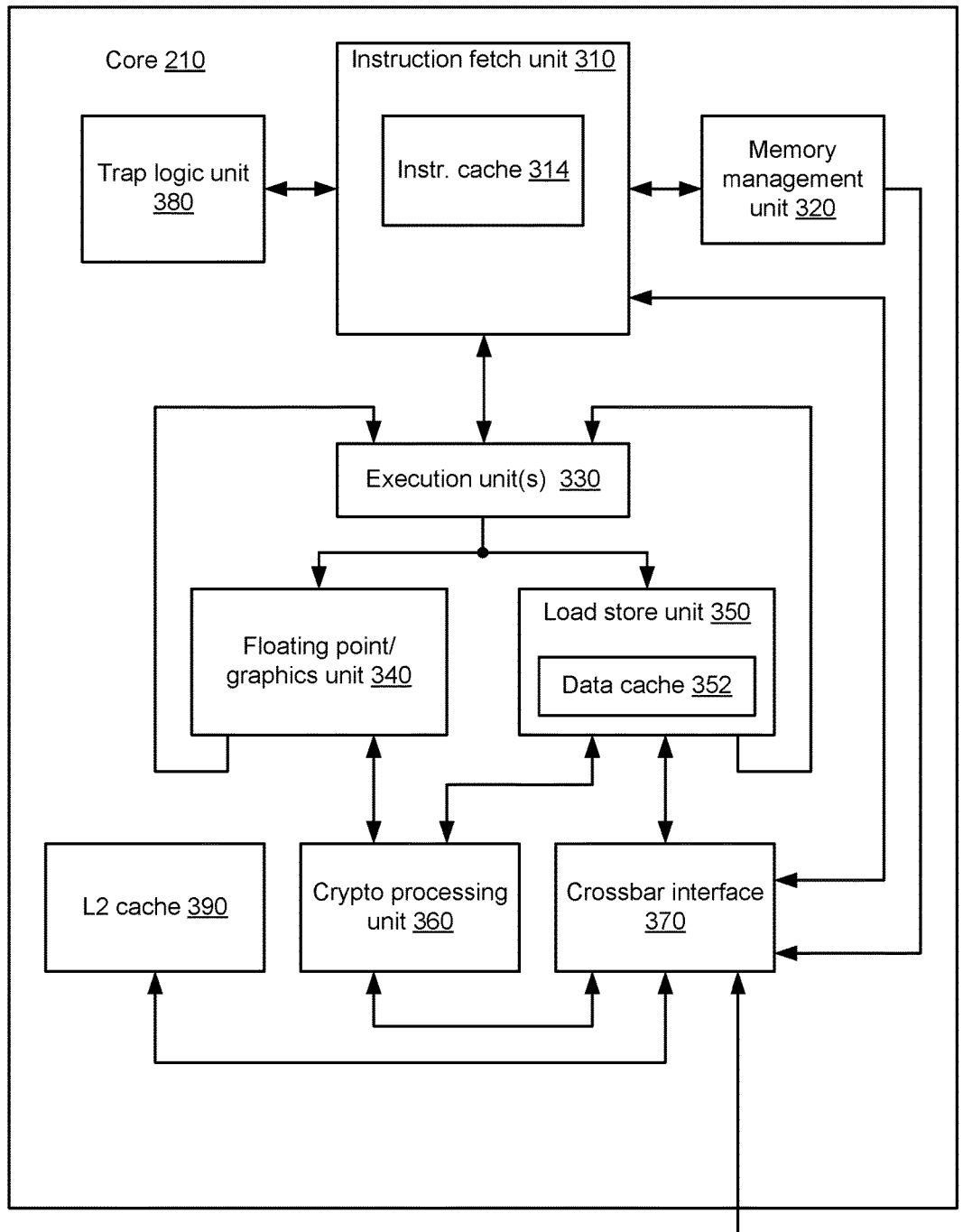
FIG. 3 is a block diagram of an embodiment of a processor core.

A possible embodiment of core 210 configured is illustrated in FIG. 3. In the illustrated embodiment, core 210 includes an instruction fetch unit (IFU) 310 coupled to a memory management unit (MMU) 320, a crossbar interface 370, a trap logic unit (TLU) 380, a L2 cache memory 390, and a plurality of execution units 330. Execution units 330 is coupled to both a floating point/graphics unit (FGU) 340 and a load store unit (LSU) 350. Each of the latter units is also coupled to send data back to each of execution units 330. Both FGU 340 and LSU 350 are coupled to a crypto processing unit 360. Additionally, LSU 350, crypto processing unit 360, L2 cache memory 390 and MMU 320 are coupled to crossbar interface 370, which may in turn be coupled to crossbar 220 shown in FIG. 2.

Instruction fetch unit 310 may be configured to provide instructions to the rest of core 210 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by core 210, and to coordinate the retrieval of instructions from instruction cache 314 according to those fetch addresses. Additionally, in some embodiments IFU 310 may include logic to predict branch outcomes and/or fetch target addresses, such as a Branch History Table (BHT), Branch Target Buffer (BTB), or other suitable structure, for example.

In one embodiment, IFU 310 may be configured to maintain a pool of fetched, ready-for-issue instructions drawn from among each of the threads being executed by core 210. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. For example, a given instruction from a certain thread may fall in the shadow of a conditional branch instruction from that same thread that was predicted to be taken or not-taken, or a load instruction from that same thread that was predicted to hit in data cache 352, but for which the actual outcome has not yet been determined. In such embodiments, after receiving notice of a misspeculation such as a branch misprediction or a load miss, IFU 310 may be configured to cancel misspeculated instructions from a given thread as well as issued instructions from the given thread that are dependent on or subsequent to the misspeculated instruction, and to redirect instruction fetch appropriately.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 210 may include more than one execution unit 330, and each of the execution units may or may not be symmetric in functionality. Finally, in the illustrated embodiment instructions destined for FGU 340 or LSU 350 pass through execution unit 330. However, in alternative embodiments it is contemplated that such instructions may be issued directly from IFU 310 to their respective units without passing through execution unit 330.

Floating point/graphics unit 340 may be configured to execute and provide results for certain floating-point and graphics-oriented instructions defined in the implemented ISA. For example, in one embodiment FGU 340 may implement single-and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 340 may implement partitioned-arithmetic and graphics-oriented instructions defined by a version of the SPARC® Visual Instruction Set (VIS™) architecture, such as VIS™ 2.0. Additionally, in one embodiment FGU 340 may implement certain integer instructions such as integer multiply, divide, and population count instructions, and may be configured to perform multiplication operations on behalf of stream processing unit 240. Depending on the implementation of FGU 360, some instructions (e.g., some transcendental or extended-precision instructions) or instruction operand or result scenarios (e.g., certain denormal operands or expected results) may be trapped and handled or emulated by software.

In the illustrated embodiment, FGU 340 may be configured to store floating-point register state information for each thread in a floating-point register file. In one embodiment, FGU 340 may implement separate execution pipelines for floating point add/multiply, divide/square root, and graphics operations, while in other embodiments the instructions implemented by FGU 340 may be differently partitioned. In various embodiments, instructions implemented by FGU 340 may be fully pipelined (i.e., FGU 340 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 350 may be configured to process data memory references, such as integer and floating-point load and store instructions as well as memory requests that may originate from stream processing unit 360. In some embodiments, LSU 350 may also be configured to assist in the processing of instruction cache 314 misses originating from IFU 310. LSU 350 may include a data cache 352 as well as logic configured to detect cache misses and to responsively request data from L3 cache 230 via crossbar interface 370. In one embodiment, data cache 352 may be configured as a write-through cache in which all stores are written to L3 cache 230 regardless of whether they hit in data cache 352; in some such embodiments, stores that miss in data cache 352 may cause an entry corresponding to the store data to be allocated within the cache. In other embodiments, data cache 352 may be implemented as a write-back cache.

In one embodiment, LSU 350 may include a miss queue configured to store records of pending memory accesses that have missed in data cache 352 such that additional memory accesses targeting memory addresses for which a miss is pending may not generate additional L3 cache request traffic. In the illustrated embodiment, address generation for a load/store instruction may be performed by one of EXUs 330. Depending on the addressing mode specified by the instruction, one of EXUs 330 may perform arithmetic (such as adding an index value to a base value, for example) to yield the desired address. Additionally, in some embodiments LSU 350 may include logic configured to translate virtual data addresses generated by EXUs 330 to physical addresses, such as a Data Translation Lookaside Buffer (DTLB).

Crypto processing unit 360 may be configured to implement one or more specific data processing algorithms in hardware. For example, crypto processing unit 360 may include logic configured to support encryption/decryption algorithms such as Advanced Encryption Standard (AES), Data Encryption Standard/Triple Data Encryption Standard (DES/3DES), or Ron's Code #4 (RC4). Crypto processing unit 240 may also include logic to implement hash or checksum algorithms such as Secure Hash Algorithm (SHA-1, SHA-256), Message Digest 5 (MD5), or Cyclic Redundancy Checksum (CRC). Crypto processing unit 360 may also be configured to implement modular arithmetic such as modular multiplication, reduction and exponentiation. In one embodiment, crypto processing unit 360 may be configured to utilize the multiply array included in FGU 340 for modular multiplication. In various embodiments, crypto processing unit 360 may implement several of the aforementioned algorithms as well as other algorithms not specifically described.

Crypto processing unit 360 may be configured to execute as a coprocessor independent of integer or floating-point instruction issue or execution. For example, in one embodiment crypto processing unit 360 may be configured to receive operations and operands via control registers accessible via software; in the illustrated embodiment crypto processing unit 360 may access such control registers via LSU 350. In such embodiments, crypto processing unit 360 may be indirectly programmed or configured by instructions issued from IFU 310, such as instructions to read or write control registers. However, even if indirectly programmed by such instructions, crypto processing unit 360 may execute independently without further interlock or coordination with IFU 310. In another embodiment crypto processing unit 360 may receive operations (e.g., instructions) and operands decoded and issued from the instruction stream by IFU 310, and may execute in response to such operations. That is, in such an embodiment crypto processing unit 360 may be configured as an additional functional unit schedulable from the instruction stream, rather than as an independent coprocessor.

In some embodiments, crypto processing unit 360 may be configured to freely schedule operations across its various algorithmic subunits independent of other functional unit activity. Additionally, crypto processing unit 360 may be configured to generate memory load and store activity, for example to system memory. In the illustrated embodiment, crypto processing unit 360 may interact directly with crossbar interface 370 for such memory activity, while in other embodiments crypto processing unit 360 may coordinate memory activity through LSU 350. In one embodiment, software may poll crypto processing unit 360 through one or more control registers to determine result status and to retrieve ready results, for example by accessing additional control registers. In other embodiments, FGU 340, LSU 350 or other logic may be configured to poll crypto processing unit 360 at intervals to determine whether it has results that are ready to write back. In still other embodiments, crypto processing unit 360 may be configured to generate a trap when a result is ready, to allow software to coordinate result retrieval and processing.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

L2 cache memory 390 may be implemented in some embodiments as a writeback cache in which written (dirty) data may not be written to system memory until a corresponding cache line is evicted. L2 cache memory 390 may variously be implemented as single-ported or multiported (i.e., capable of processing multiple concurrent read and/or write accesses). In either case, L2 cache memory 390 may implement arbitration logic to prioritize cache access among various cache read and write requestors.

In some embodiments, L2 cache memory 390 may be configured to operate in a diagnostic mode that allows direct access to the cache memory. For example, in such a mode, L2 cache memory 390 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L2 cache memory 390. Alternatively, crossbar interface 370 or MMU 320 may be configured to allow direct access to L2 cache memory 390 via the crossbar interface.

L2 cache memory 390 may be further configured to implement a BIST. An address generator, a test pattern generator, and a BIST controller may be included in L2 cache memory 390. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L2 cache memory 390 are capable of storing both a logical 0 and logical 1. In the case where the BIST determines that not all data storage cells within L2 cache memory 390 are functional, a flag or other signal may be activated indicating that L2 cache memory 390 is faulty.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 314 or data cache 352. In the event no translation for a given virtual page number is found in the appropriate TLB, memory management unit 320 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 320 is unable to derive a valid address translation, for example if one of the memory pages including a page table is not resident in physical memory (i.e., a page miss), MMU 320 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 210 may be configured to generate off-core memory or I/O requests. For example, IFU 310 or LSU 350 may generate access requests to L3 cache 230 in response to their respective cache misses. Crypto processing unit 360 may be configured to generate its own load and store requests independent of LSU 350, and MMU 320 may be configured to generate memory requests while executing a page table walk. Other types of off-core access requests are possible and contemplated. In the illustrated embodiment, crossbar interface 370 may be configured to provide a centralized interface to the port of crossbar 220 associated with a particular core 210, on behalf of the various functional units that may generate accesses that traverse crossbar 220. In one embodiment, crossbar interface 370 may be configured to maintain queues of pending crossbar requests and to arbitrate among pending requests to determine which request or requests may be conveyed to crossbar 220 during a given execution cycle. For example, crossbar interface 370 may implement a least-recently-used or other algorithm to arbitrate among crossbar requestors. In one embodiment, crossbar interface 370 may also be configured to receive data returned via crossbar 110, such as from L3 cache 230 or I/O interface 250, and to direct such data to the appropriate functional unit (e.g., data cache 352 for a data cache fill due to miss). In other embodiments, data returning from crossbar 220 may be processed externally to crossbar interface 370.

During the course of operation of some embodiments of core 210, exceptional events may occur. For example, an instruction from a given thread that is picked for execution by pick unit 316 may be not be a valid instruction for the ISA implemented by core 210 (e.g., the instruction may have an illegal opcode), a floating-point instruction may produce a result that requires further processing in software, MMU 320 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 380 may be configured to manage the handling of such events. For example, TLU 380 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 380 may be configured to flush all instructions from the trapping thread from any stage of processing within core 210, without disrupting the execution of other, non-trapping threads. In some embodiments, when a specific instruction from a given thread causes a trap (as opposed to a trap-causing condition independent of instruction execution, such as a hardware interrupt request), TLU 380 may implement such traps as precise traps. That is, TLU 380 may ensure that all instructions from the given thread that occur before the trapping instruction (in program order) complete and update architectural state, while no instructions from the given thread that occur after the trapping instruction (in program order) complete or update architectural state.

Interrupt Handling and Event Queues

Figure 4:
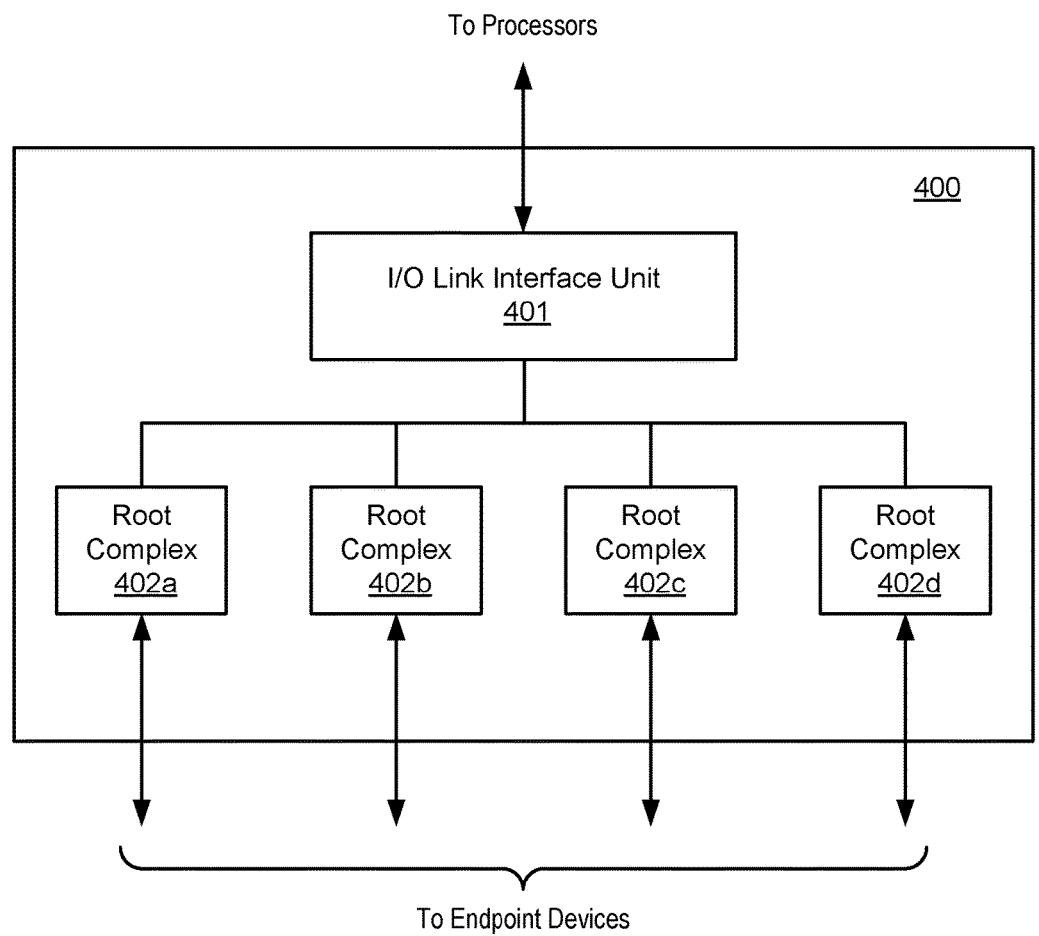
FIG. 4 illustrates an embodiment of a Input/Output Hub.

An embodiment of an I/O hub is illustrated in FIG. 4. I/O hub 400 may, in various embodiments, correspond to I/O hub 150 of DCU 100 as illustrated in FIG. 1. In the illustrated embodiments, I/O hub 400 includes I/O link interface unit 401 which is coupled to processor host and to I/O device communication units (also referred to herein as "Root Complexes") 402a-d. I/O hub 400 may in various embodiments be configured to relay requests and responses (collectively "transactions") between a processor and endpoint devices (both not shown) using one of various communication protocols, such as, PCIe, for example. In some embodiments, each Root Complex may translate transactions from one communication protocol to another, and may implement address translation tables to translate from an I/O device address space (or multiple I/O device address spaces) to a host memory address space.

As described below in more detail, I/O hub 400 may issue read-modify-write commands to add an entry into an Event Queue (EQ) data structure in memory in response to receiving a request from an endpoint device through a Root Complex. As part of the read-modify-write operations, I/O hub 400 may retrieve pointer information from a corresponding Event Queue Control Block (EQCB) and, after modifying the pointer information, write the modified data back into the corresponding EQCB. In various embodiments, I/O hub 400 may also write to the EQ data structure dependent upon the modified pointer.

It is noted that the embodiment illustrated in FIG. 4 is merely an example. In other embodiments, different numbers of Root Complexes and different arrangements of Root Complexes are possible and contemplated.

Figure 5:
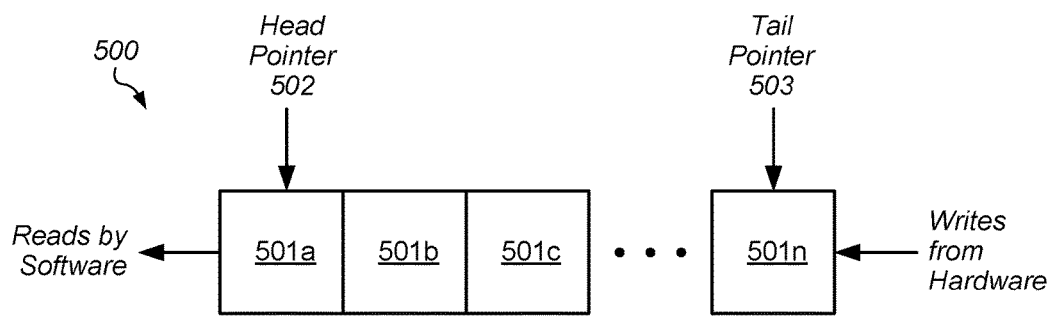
FIG. 5 illustrates a block diagram of an embodiment of an Event Queue data structure.

Turning to FIG. 5, an embodiment of an Event Queue (EQ) is illustrated. An EQ is a data structure that may be stored in a memory, such as, e.g., memory 110A as illustrated in FIG. 1, and may store events that should trigger an Input/Output (I/O) interrupt. A computing system may employ any number of EQs dependent upon the needs of the system. A programmable mapping may be employed to map I/O endpoint device interrupt vectors and messages types to a specific EQ. As described below in more detail, the programmable mapping may be virtualized so that each requester indentity (ID) has its own unique EQ mapping.

An EQ may include multiple entries organized a circular First-In First-Out buffer with a programmable depth. Entries may be written by RCs within a computing system, and entries may be read by software programs being executed within the computing system. In computing systems that employ multiple EQs, all EQs may have the same depth, or each EQ may have its own unique depth. Head pointer 502 and tail pointer 503 may, in some embodiments, be used to indicate the depth and location of the EQ 500 within a memory.

In the illustrated embodiment, EQ 500 includes entries 501A through 501N. Each included entry in EQ 500 may describe a single event such as, e.g., receipt of a MSI/MSI-X transaction or a PCIe message, and may be a size of a cache line. A reserve tail pointer (not shown) may be employed, in some embodiments, to allow multiple RCs to write entries atomically into a single EQ. Each RC accessing a given EQ may reside within a single I/O hub chip within a computing system or, in other embodiments, each RC may reside on different I/O hub chips within a computing system.

It is noted that the EQ illustrated in FIG. 5 is merely an example. In other embodiments, different pointers, and different contents within an entry are possible and contemplated.

In addition to EQ data structures, Event Queue Control Block (EQCB) structures may also be employed. An EQCB is a data structure stored in memory, such as, e.g., memory 110A as illustrated in FIG. 1, which includes values relating to a corresponding EQ. Within a computing system utilizing multiple EQs, each EQ may have a corresponding EQCB.

Figure 6:
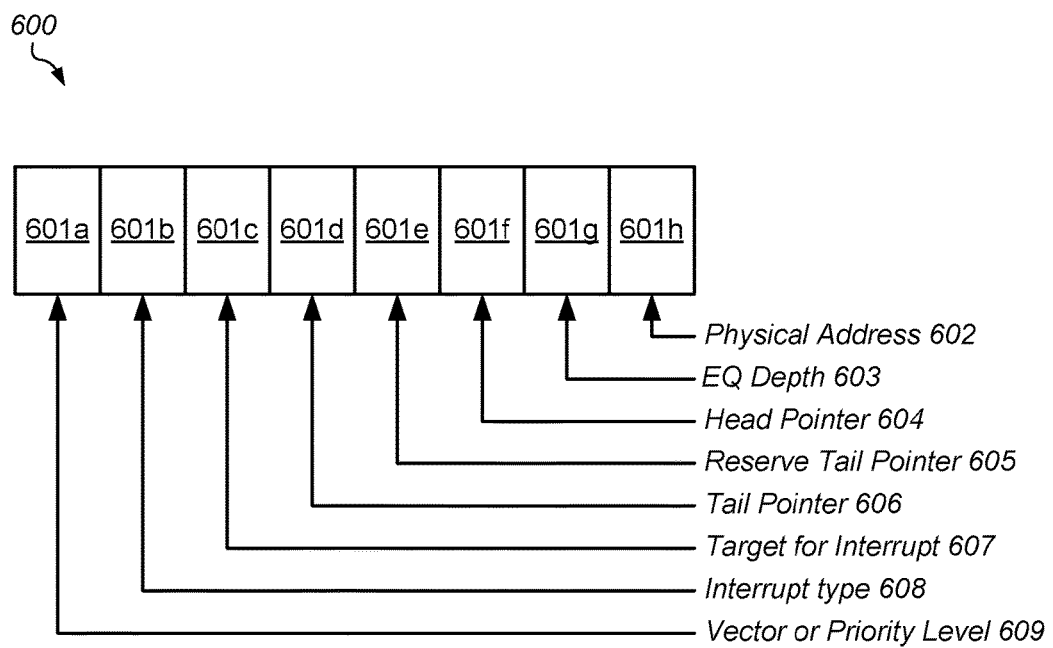
FIG. 6 illustrates a block diagram of an embodiment of an Event Queue Control Block data structure.

An embodiment of a EQCB is illustrated in FIG. 6. In the illustrated embodiment, EQCB 600 includes data portions 601a through 601h, each corresponding to physical address 602, EQ depth 603, head pointer 604, reserve tail pointer 605, tail pointer 606, target for interrupt 607, interrupt type 608, and vector or priority level 609. In some embodiments, head pointer 603 and tail pointer 605 may correspond to head pointer 502 and tail pointer 503, respectively. It is noted that in some embodiments, physical address 602 may be a virtual address.

EQ depth 603 may be the depth of a corresponding EQ such as, e.g., EQ 500 as illustrated in FIG. 5. Physical address 602 may correspond to a base physical address in host memory for the corresponding EQ, and interrupt type 608 may indicate that an interrupt is a vector interrupt directed to a hardware register, or a software interrupt directed to a software queue. Vector or priority level 609 may be dependent upon the type of interrupt as indicated by interrupt type 608. For example, vector or priority 609 may include the vector in the case of a vector interrupt, or the priority level of a software interrupt.

It is noted that the embodiment of an EQCB depicted in FIG. 6 is merely an example. In various embodiments, different information may be stored within an EQCB.

Figure 7:
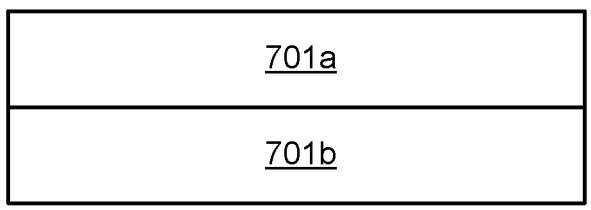
FIG. 7 illustrates a block diagram of an embodiment of a filter bit table data structure.
Figure 7:
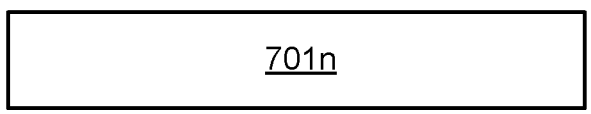

Another data structure that may be employed is a filter bit table. Such a table may be used for PCIe message signaled interrupts (MSI/MSI-X) transactions, or an equivalent message in any suitable I/O protocol, and may, in various embodiments, provide a throttle features for such transactions. An embodiment of a filter bit table is illustrated in FIG. 7. In the illustrated embodiment, filter bit table 700 includes entries 701A through 701N. Each entry may, in various embodiments, include 32-bits of data, and 16 entries may be stored together into a single 64-byte cache line in memory.

During operation, each entry may correspond to a given vector that may be included in an MSI/MSI-X transaction. Each entry may be set to a predetermined value indicating whether a transaction vector corresponding to the given entry is filter or not filtered. For example, if all bits of an entry are set to 1'b1 (0xFFFF_FFFF), then MSI/MSI-X transactions corresponding to the entry may be filtered, i.e., transactions will not be processed until the filter has been cleared by software. In some embodiments, any other value in an entry indicates that corresponding transactions may not be filtered, i.e., the relevant information from the MSI/MSI-X transaction would be placed in an appropriate Event Queue.

In some embodiments, hardware may set all the bits of an entry in filter table 700 when an MSI/MSI-X transaction that is unfiltered arrives at a Root Complex, such as, e.g., Root Complex 402A, as illustrated in FIG. 4. Software may then write a Root Complex Identifier after the software has finished processing the corresponding entry to the unfiltered MSI/MSI-X transaction. Data returned to an I/O hub, such as, e.g., I/O hub 400 as illustrated in FIG. 4, when the I/O hub reads filter table 700 for an unfiltered MSI/MSI-X transaction may be inserted by the Root Complex which sourced the MSI/MSI-X transaction into an Event Queue entry to identify the Root Complex instance. In some embodiments, the Root Complex inserting the data may provide a means for software to identify which Root Complex generated the MSI/MSI-X and Event Queue entry when the Event Queue is shared by multiple Root Complexes.

It is noted that the embodiment of a filter bit table illustrated in FIG. 7 is merely an example. Other embodiments with different numbers of entries and different sizes of entries are possible and contemplated.

Figure 8:
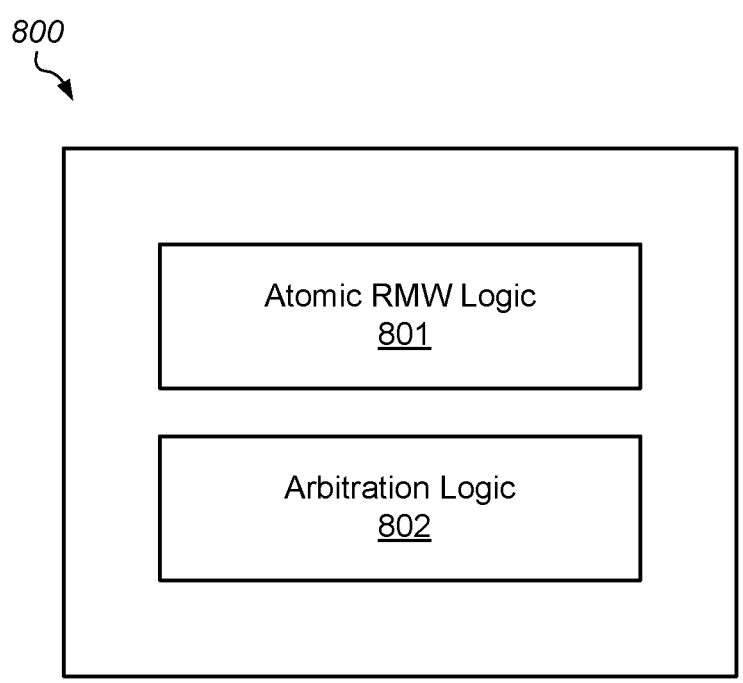
FIG. 8 illustrates an embodiment of an embodiment of an Input/Output link interface unit.

Turning to FIG. 8, an embodiment of an I/O Link Interface Unit (ILU) is illustrated. In the illustrated embodiment, ILU 800 includes Atomic read-modify-write (RMW) Logic 801 and arbitration logic 802. In various embodiments, ILU 800 may correspond to ILU 401 of I/O Hub 400 as illustrated in FIG. 4.

During operation, atomic RMW logic 801 issues RMW transactions on behalf of each of the root complexes, such as, e.g., root complexes 402A through 402D as illustrated in FIG. 4, in an I/O hub. The transactions may be issued in support of EQCB pointer manipulation to store information in a given EQ. To that end, atomic RMW logic 801 may issue any cache line write invalidate transactions.

Arbitration logic 802 may, in various embodiments, arbitrate request from each of the Root Complexes included with in an I/O hub. A single request may be selected by arbitration logic 802 from amongst various requests, and forwarded to atomic RMW logic 801 so that any RMW transactions may be issued. Arbitration logic 802 may employ one of numerous arbitration schemes for selecting a given request. For example, arbitration logic 802 may employ a round robin scheduling algorithm, or any other suitable algorithm. In various embodiments, arbitration logic 802 may include temporary storage, such as, e.g., buffers or register files, and one or more multiplex circuits.

The embodiment of an ILU illustrated in FIG. 8 is merely an example. In other embodiments, different functional blocks and different configurations of functional blocks may be employed to implement the functionality of and I/O Link Interface Unit.

Figure 9:
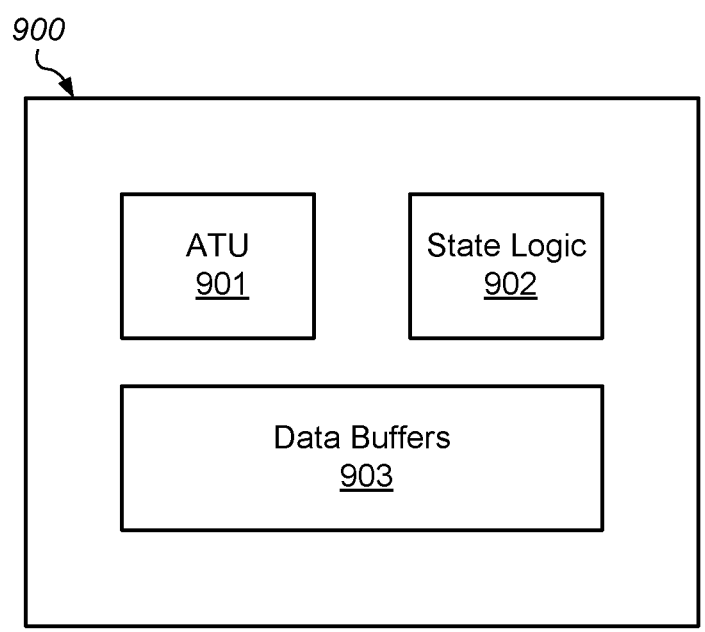
FIG. 9 illustrates an embodiment of a Root Complex.

Turning to FIG. 9, an embodiment of a Root Complex is illustrated. Root Complex 900 may, in various embodiments, correspond to any of Root Complexes 402A through 402D as illustrated in FIG. 4. In the illustrated embodiment, Root Complex 900 includes address translation unit (ATU) 901, state logic 902, and data buffers 903.

Data buffers 903 may include multiple memories or registers used for temporary storage of incoming requests from assorted endpoint devices. Such memories may be SRAMs, DRAMs, or any other suitable type of memory. In some embodiments, registers may be configured to form register files, or First-in First-out (FIFO) buffers, or other suitable memory structures for storing the incoming requests.

State logic 902 may be configured to sequence through various logical states in order to process an incoming request, such as, e.g., and a MSI/MSI-X or PCIe message, and forward in an ILU within an I/O hub, and ultimately delivering an interrupt to a target thread. As used and described herein, state logic (also referred to as a "state machine") is a particular embodiment of a sequential logic configured to transition between various predefined logical states dependent upon external stimulus. In some embodiments state logic may include one or more latches or flip-flops each of which may store a portion of an overall logic state of the state logic.

Address translation unit 901 may include one or more memories configured to operate as cache memories or look-up tables. An MSI/MSI-X vector or PCIe message type may be mapped to a specific Event Quest by address translation unit 901. As described below in more detail, address translation table 901 may be used to virtualize MSI/MSI-X and message resources. In such cases, a Bus/Device/Function (BDF) number may be used in the mapping function. The BDF may, in various embodiments, may include 16-bits of data that are part of a PCIe Translation Layer Packet (TLP), which is commonly referred to as a "Requester ID."

During operation, Root Complex 900 may be coupled to directly to an endpoint device. In some system, however, Root Complex 900 may be coupled to one or more switches, endpoint, or even other Root Complexes. In such cases a hierarchy of switch fabrics may be employed by the system to connect processor to a myriad of endpoint devices.

The embodiment depicted in FIG. 9 is merely an example. In other embodiments, different numbers of data buffers and different numbers of address translation tables may be employed.

Figure 10:
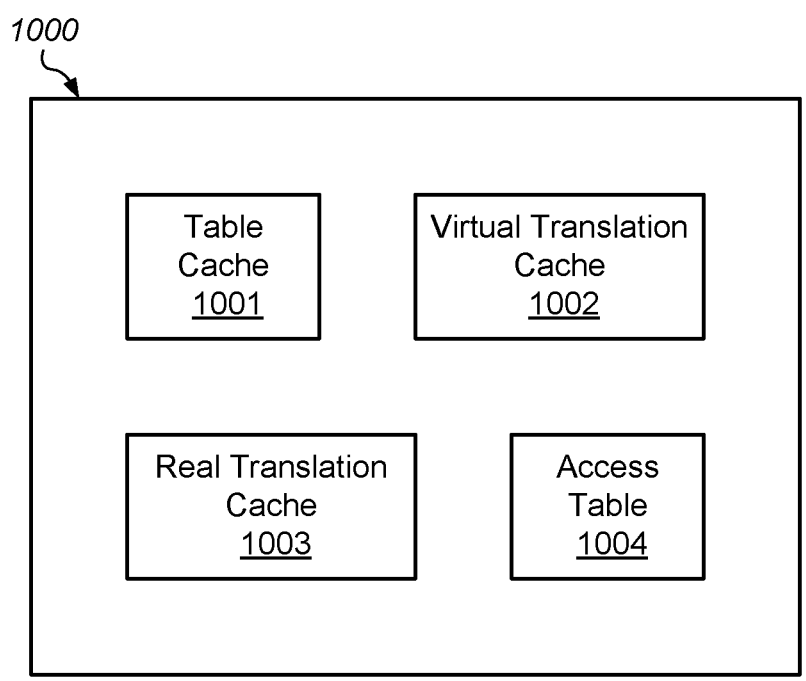
FIG. 10 illustrates an embodiment of an address translation unit.

In order to map a given message or vector to an Event Queue, a translation unit may be employed. An embodiment of such a translation unit is illustrated in FIG. 10. In the illustrated embodiment, address translation table 1000 includes table cache 1001, virtual translation cache 1002, real translation cache 1003, and access table 1004. Address translation unit 1000 may, in some embodiments, correspond to address translation table 901 as illustrated in the embodiment of a Root Complex as depicted in FIG. 9.

During operation, address translation unit 1000 may operate in one of various modes of operation. For example, address translation unit 1000 may in a virtual translation mode, a real translation mode, a physical offset mode, or any other suitable mode of operation for mapping a received vector or message to a particular Event Queue data structure in memory. In virtual translation mode, the request address may be interpreted as an I/O virtual address, which may then be translated to a real address and then into a physical address. When operating in real translation mode, the request address may be interpreted as a real address, which may then be translated to a physical address. In physical offset mode, the request address may be interpreted as an offset of a base physical address.

In order to access the aforementioned tables, address translation unit 1000 may synthesize an I/O virtual address (IOVA) as well as a Requester ID based on a received MSI/MSI-X vector. In some embodiments, the synthesized IOVA address may include 64-bits, where each of bits 13 through 28 are set to a corresponding bit of the received 16-bits of MSI data. The remaining bits of the synthesized IOVA address may be set to zero. In other embodiments, the Requester ID may be set to a PCIe Requester ID, which may include a 16-bit BDF number of a PCIe device that sent the MSI/MSI-X vector.

The synthesized IOVA may used to access virtual translation cache 1002 to retrieve a real address dependent upon the IOVA. Once the real address has been determined, it may be used to access real translation cache 1003 to determine a physical address. The determined physical address may then be used to access a corresponding Event Queue.

In some embodiments, the synthesized Requester ID may be used to access table cache 1001 to obtain a base physical address. A physical address may then be determined dependent upon information retrieved from access table 1004 dependent upon the synthesized IOVA.

It is noted that the embodiment illustrated in FIG. 10 is merely an example. In other embodiments, different numbers of cache memories and different organizations of cache memories are possible and contemplated. In general, when the requested entry does not reside in the given cache, the Root Complex may need to fetch the entry from host memory, and load the entry into the cache using a suitable cache line replacement algorithm.

Figure 11:
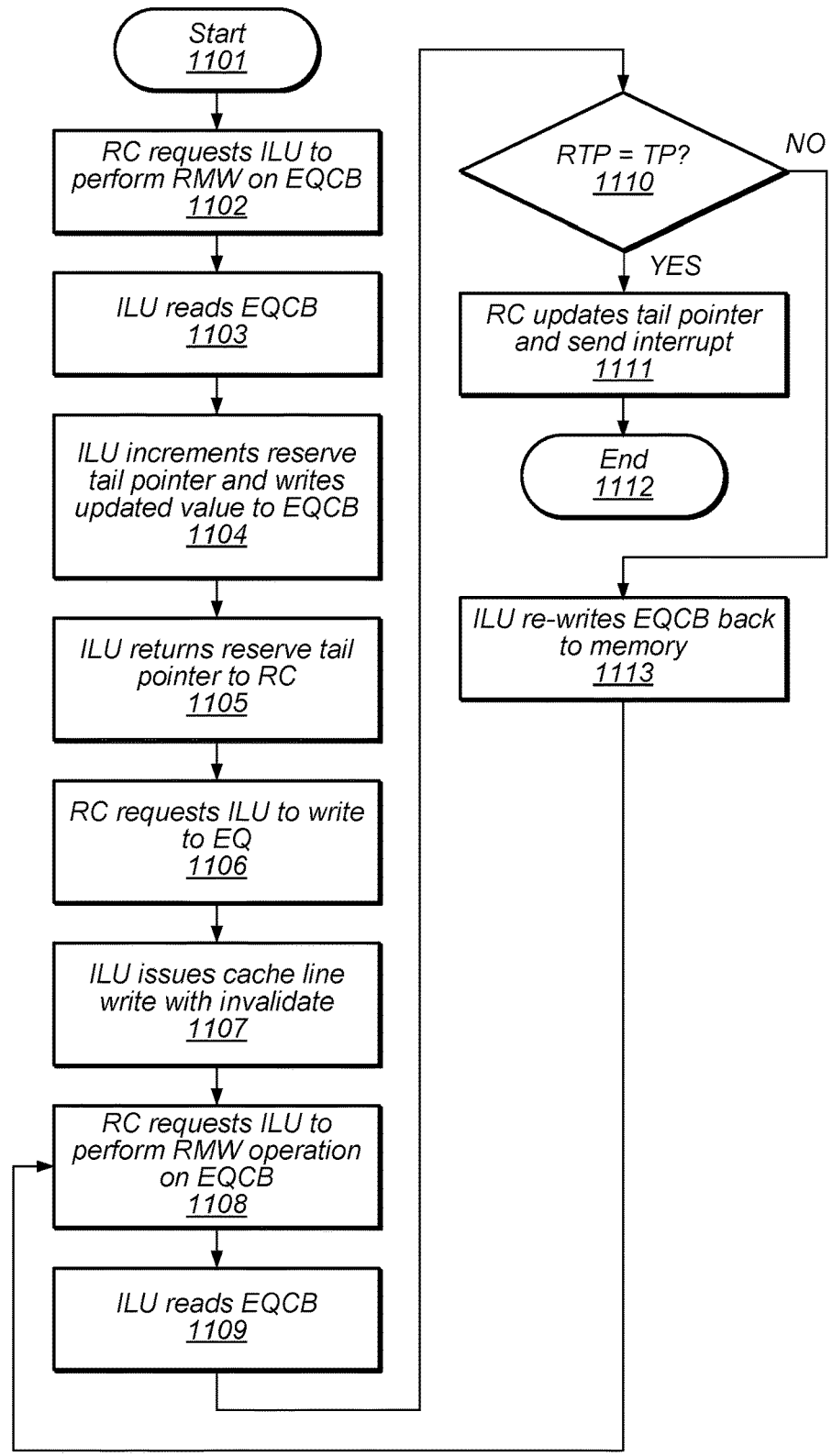
FIG. 11 illustrates a flowchart depicting an embodiment of a method for aggregating interrupts and messages in a Root Complex.

Turning to FIG. 11, a flowchart depicting an embodiment of a method for aggregating messages and interrupts is illustrated. Referring collectively to FIG. 4, and the flowchart of FIG. 11, the method begins in block 1101. A Root Complex, such as, e.g., Root Complex 402a, may request ILU 401 to perform a read-modify-write (RMW) operation on an EQCB (block 1102). The request may be made in response to Root Complex 402 receiving information from an endpoint device, such as, e.g., endpoint device 160a as illustrated in FIG. 1, responsive to an event or error condition.

ILU 401 may then read the EQCB (block 1103). ILU 401 may retrieve reserve tail pointer information, such as reserve tail pointer 605 as illustrated in FIG. 6, from the data read from the EQCB. The reserve tail pointer may then be incremented and written back to the EQCB (block 1104). ILU 401 may also send the incremented reserve tail pointer to requesting Root Complex (block 1105). The Root Complex may then, in turn, request that ILU 401 perform a write to an address location dependent upon the incremented reserve tail pointer (block 1106). In some embodiments, the incremented reserve tail pointer may be multiplied by an entry size (typically, one cache line) and added to a base address, such as, physical address 602 as illustrated in FIG. 6.

ILU 401 may then issue a cache line write instruction with invalidate (block 1107). The instruction may be issued to the memory containing the targeted Event Queue data structure. Once the cache line write instruction has been issued, the Root Complex may then request ILU 401 to perform another RMW operation on the EQCB (block 1108). As before, ILU 401 may then read the EQCB (block 1109). The method may then depend on a comparison of the tail pointer and the reserve tail pointer retrieved from the read EQCB (block 1110).

When the reserve tail pointer and the tail pointer are equal, the Root Complex updates the tail pointer and writes the updated tail pointer value back to the EQCB and sends an interrupt to the target processor, processor core, or execution thread (block 1111). The method may then conclude in block 1112.

When the reserve tail pointer and the tail pointer are not equal, ILU 401 may then write the EQCB back to memory. In some embodiments, when the reserve tail pointer and the tail pointer are not equal, there may be entries in the Event Queue that need to be processed before the entry of the requesting Root Complex. ILU 401 may signal the Root Complex that it should re-try the RMW operation at a later time. The method may then proceed as described above from block 1108.

The Root Complex may continue to try until a determination is made that the reserve tail pointer and the tail pointer are equal. In some embodiments, a programmable limit may be imposed on the number of times a Root Complex may request the RMW operation, thereby preventing an infinite loop. In such cases, software may execute a predefined set of program instructions to recover from this situation. The existing Event Queue entries may, in various embodiments, be preserved.

Although the operations of the method illustrated in FIG. 11 are depicted as being performed in a sequential fashion, in other embodiments, one or more of the depicted operations may be performed in parallel.

Virtualization

Virtualization may be used in a computer system to allow multiple guest operating system (GOS) instances to share hardware such that individual GOS instances are protected and isolated from each other. In some embodiments, by isolating individual GOS instances, more efficient use of a computer system's resources may be realized. For example, a fatal error or performance bottleneck in one GOS instance should not interfere with other GOS instances. The use of virtualization may, in various embodiments, allow for a lower cost of a computing system. For example, a datacenter may employ a single virtualized system as opposed to purchasing multiple servers, thereby lowering the overall cost of the computing system.

I/O subsystems may also be virtualized, thereby allowing I/O devices such as a NIC or disk controller to be shared by multiple GOS instances. In order to virtualize I/O, an I/O device interrupt must be associated with a specific GOS instance within the context of a switch fabric, such as, e.g., PCIe, to which the I/O is connected. Some switch fabric protocols provide an inband mechanism, such as, e.g., MSI/MSI-X, for communicating an event or an error to a Root Complex, but may not provide a well-defined architecture to allocate and distribute I/O resources amongst GOS instances. Interrupt and message processing may result in a degradation of computing performance.

In some computing systems, messages and interrupts may be distributed amongst multiple GOS instances in a static fashion. Such a distribution method may result in performance issues as there is an implicit assumption that each GOS instance has similar performance and workload characteristics. By virtualizing messages and interrupts, I/O resources may, in various embodiments, be distributed amongst various GOS instances, while reducing any performance degradation.

Figure 12:
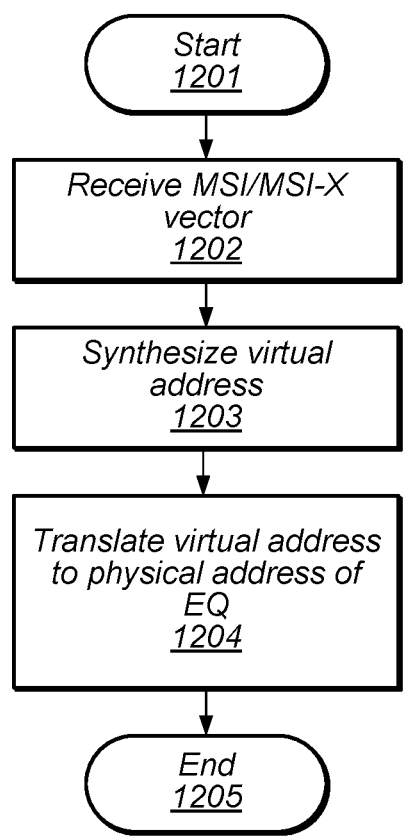
FIG. 12 illustrates a flowchart depicting an embodiment of a method for virtualizing interrupts and messages in a Root Complex.

Turning to FIG. 12, a flowchart depicting an embodiment of a method for virtualizing messages and interrupts is illustrated. Referring collectively to FIG. 4, FIG. 10, and the flowchart of FIG. 12, the method begins in block 1201. A MSI/MSI-X vector or message with a specific type (one of several types, for example, that may be used in the PCIe protocol) may then be received (block 1202). In various embodiments, each of Root Complexes 402a through 402d may receive such signals, and each Root Complex may process the received vector or message. In various embodiments, each requester may be assigned a set of address spaces to facilitate mapping the received message or interrupt to an appropriate Event Queue.

Address translation unit 1000 may then synthesize a virtual address (block 1203). The synthesized virtual address may depend on MSI/MSI-X data. For example, 16-bits of MSI/MSI-X data may be mapped to data bits 13 through 28 of the synthesized virtual address. Other bits of the synthesized virtual address may then be set to zero. In some embodiments, a Requester ID may also be synthesized. A 16-bit PCIe Requester ID may, in various embodiments, be used as the synthesized Requester ID. In some embodiments, the received information may be interpreted as a real address or an offset from a base address in which case, the synthesis of the virtual address may not be performed.

Once the virtual address has been synthesized, it may be translated to a physical address (block 1204). The physical address may correspond to a location in memory of an Event Queue. In some embodiments, a virtual transaction cache, such as virtual translation cache 1002, may be accessed to determine a real address. As used and described herein, a real address may correspond to a location in memory of an Event Queue from the perspective of application or other software being executed on a computing system. The determined real address may then be used to access a real translation cache, such as, e.g., real translation cache 1003 to determine a physical address.

The method may then conclude in block 1205. In some embodiment, the translated physical address may be used in conjunction with the method illustrated in FIG. 11, where the physical address produced by the flow in FIG. 11 is used as the address for the EQCB access described in block 1102. It is noted that the embodiment of the method depicted in FIG. 12 is merely an example. In other embodiments, different operations and different orders of operations may be employed.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a memory configured to store data associated with a plurality of queues;
a plurality of root complexes, wherein each root complex of the plurality of root complexes is coupled to a respective plurality of endpoint devices and wherein a particular root complex is configured to:
receive a message from a requester device;
synthesize a virtual address using at least part of the message; and
an interface unit configured to store the message in a particular queue of the plurality of queues.

2. The apparatus of claim 1, wherein the particular root complex is further configured to synthesize a request identification.

3. The apparatus of claim 2 wherein the particular root complex is further configured to translate the virtual address to a physical address.

4. The apparatus of claim 1, wherein the message is associated with an Input/Output (I/O) interrupt associated with a particular endpoint device.

5. The apparatus of claim 1, wherein the particular root complex is further configured determine a real address using the virtual address.

6. The apparatus of claim 1, further comprising a processor configured to:
    read, in response to executing one or more program instructions, event data previously stored in a second queue of the plurality of queues; and
    select a particular execution thread of a plurality of execution threads executing on the processor using the event data.

7. A method, comprising:
    receiving a request by a particular root complex of a plurality of root complexes coupled to respective pluralities of endpoint devices in a computing system;
    synthesizing, by the particular root complex, a virtual address using at least part of the request; and
    storing the request in an event data queue stored in a memory configured to store data associated with a plurality of queues.

8. The method of claim 7, wherein the request includes a message signaled interrupt.

9. The method of claim 7, wherein the request is associated with an Input/Output (I/O) interrupt associated with an endpoint device.

10. The method of claim 7, further comprising translating the virtual address to a physical address.

11. The method of claim 10, further comprising accessing a real translation cache memory to retrieve the physical address.

12. The method of claim 7, further comprising synthesizing a requester identification using at least part of the request.

13. The method of claim 7, further comprising selecting a particular execution thread of a plurality of execution threads executing on a particular processor core.

14. A system, comprising:
    one or more memories, wherein at least one memory of the one or more memories is configured to store data associated with event data queue;
    an endpoint device configured to send a message;
    a plurality of root complexes, wherein a particular root complex is configured to:
        receive the message;
        synthesize a virtual address using at least part of the message; and
        translate the virtual address to a physical address corresponding to a location in the one or more memories;
    one or more processors; and
    an interface unit configured to
        store the message in a particular entry of event data queue.

15. The system of claim 14, wherein the message includes a message signaled interrupt.

16. The system of claim 14, wherein the message is associated with an Input/Output (I/O) interrupt associated with the endpoint device.

17. The system of claim 14, wherein the particular root complex is further configured to synthesize a requester identification.

18. The system of claim 17, wherein the requester identification includes a 16-bit peripheral component interface request identification.

19. The system of claim 14, wherein the interface unit is further configured to store the message using the physical address.

20. The system of claim 14, wherein a first processor of the one or more processors is configured to read, in response to executing one or more program instructions, event data previously stored in event data queue.

* * * * *

UNITED STATES PATENT AND TRADEMARK OFFICE
CERTIFICATE OF CORRECTION

PATENT NO. : 10,489,317 B2  
APPLICATION NO. : 15/960301  
DATED : November 26, 2019  
INVENTOR(S) : Feehrer et al.

It is certified that error appears in the above-identified patent and that said Letters Patent is hereby corrected as shown below:

In the Specification

In Column 4, Line 45, delete "interconnet." and insert -- interconnect. --, therefor.

In Column 6, Lines 52-53, delete "sub systems)," and insert -- subsystems), --, therefor.

In Column 13, Line 4, delete "indentity" and insert -- identity --, therefor.

In the Claims

In Column 19, Line 11, in Claim 5, after "configured" insert -- to --.

Signed and Sealed this  
Sixteenth Day of February, 2021

Drew Hirshfeld  
*Performing the Functions and Duties of the  
Under Secretary of Commerce for Intellectual Property and  
Director of the United States Patent and Trademark Office*